US012594510B2

(12) United States Patent
Gurvich et al.

(10) Patent No.: US 12,594,510 B2
(45) Date of Patent: Apr. 7, 2026

(54) REINFORCED MEMBRANE SYSTEMS

(71) Applicant: Hamilton Sundstrand Corporation, Charlotte, NC (US)

(72) Inventors: Mark R. Gurvich, Middletown, CT (US); Jay W. Kokas, Bloomfield, CT (US); Rebecca R. Stoner, North Granby, CT (US); Andrew M. Caldecutt, Vernon, CT (US); Alan F. Hunter, West Springfield, MA (US); Haralambos Cordatos, Colchester, CT (US); Murtuza Lokhandwalla, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 513 days.

(21) Appl. No.: 17/735,118

(22) Filed: May 3, 2022

(65) Prior Publication Data

US 2023/0356112 A1 Nov. 9, 2023

(51) Int. Cl.
*B01D 69/08* (2006.01)
*B01D 19/00* (2006.01)
*B01D 63/02* (2006.01)
*B01D 63/04* (2006.01)
*B01D 69/02* (2006.01)

(52) U.S. Cl.
CPC ....... *B01D 19/0031* (2013.01); *B01D 63/021* (2013.01); *B01D 63/043* (2013.01); *B01D 69/02* (2013.01); *B01D 69/08* (2013.01); *B01D 2325/40* (2013.01)

(58) Field of Classification Search
CPC .......................... B01D 19/0031; B01D 63/021; B01D 63/043; B01D 69/02; B01D 69/08; B01D 2325/40; B01D 2311/2653; B01D 2325/24; B01D 63/02
See application file for complete search history.

(56) References Cited

U.S. PATENT DOCUMENTS

| | | | |
|---|---|---|---|
| 4,293,418 A | 10/1981 | Fujii et al. | |
| 4,631,128 A | * 12/1986 | Coplan | B01D 63/024 |
| | | | 210/488 |
| 6,623,637 B1 | 9/2003 | Monzen et al. | |
| 6,648,945 B1 | 11/2003 | Takeda et al. | |
| 8,070,859 B2 | 12/2011 | Ma et al. | |

(Continued)

FOREIGN PATENT DOCUMENTS

| | | |
|---|---|---|
| CN | 202638297 U | 1/2013 |
| CN | 204977622 U | * 1/2016 |

(Continued)

OTHER PUBLICATIONS

Extended European Search Report dated Jun. 26, 2023, issued during the prosecution of European Patent Application No. EP 23171409.8.

*Primary Examiner* — Dung H Bui
(74) *Attorney, Agent, or Firm* — Kinney & Lange, P.A.

(57) ABSTRACT
A fiber de-gassing membrane includes a plurality of membrane fibers. At least one of the membrane fibers has a first stiffness. The membrane includes reinforcing fibers. The reinforcing fibers are positioned adjacent to at least one of the membrane fibers. The reinforcing fibers have a second stiffness. The second stiffness is greater than the first stiffness.

12 Claims, 3 Drawing Sheets

(56) References Cited

U.S. PATENT DOCUMENTS

| | | | |
|---|---|---|---|
| 2002/0046970 A1* | 4/2002 | Murase | B01D 69/1071 |
| | | | 210/483 |
| 2005/0271920 A1* | 12/2005 | Eshraghi | H01M 8/1011 |
| | | | 429/535 |
| 2012/0018371 A1* | 1/2012 | Cote | B01D 69/085 |
| | | | 29/428 |
| 2012/0174790 A1 | 7/2012 | Osabe et al. | |
| 2016/0009578 A1 | 1/2016 | Cote et al. | |
| 2016/0082396 A1* | 3/2016 | Sato | B01D 69/08 |
| | | | 210/500.23 |
| 2017/0182462 A1* | 6/2017 | Torichigai | B31C 3/00 |
| 2019/0070862 A1* | 3/2019 | Tanizaki | B01D 63/0241 |
| 2019/0175811 A1* | 6/2019 | Gyoten | B01D 69/08 |
| 2022/0274068 A1* | 9/2022 | Koyuncu | B01D 71/36 |

FOREIGN PATENT DOCUMENTS

| | | | |
|---|---|---|---|
| CN | 107585865 A | | 1/2018 |
| CN | 211936379 U | * | 11/2020 |
| JP | 2001334131 A | | 12/2001 |
| JP | 06047212 B2 | | 11/2016 |

* cited by examiner

10

100

100

104

R

106

102

200

206

204

203

A

200

206

204

203

205

A

REINFORCED MEMBRANE SYSTEMS

BACKGROUND OF THE INVENTION

1. Field of the Invention

The present disclosure relates to fiber membranes and more particularly to fiber membrane cartridges used in fuel deoxygenation systems.

2. Description of Related Art

For purposes of fuel deoxygenation, devises based on membrane fibers are commonly applied in industry. The deoxygenation function is largely performed by cartridges consisting of interwoven membrane fibers. These membrane fibers usually consist of a polymeric thick hollow fiber with coated membrane. The coating allows penetration of $O_2$ via solution-diffusion and subsequent transport through pores and the hole in the fiber. In spite of efficiency of this deoxygenation implementation, there are risks of fuel leakage through the membrane, especially when the membrane fibers are subject to more aggressive load and thermal conditions or/and during longer service. Due to load (e.g., internal pressure) and thermal (e.g., temperature variation and associated thermal expansion) conditions, the membrane fibers are subjected to local loads, mainly axial local loads, which increase risk of local damage in individual membrane fibers. Increased number and sizes of these micro-damages can increase risk and severity of fuel leakage. If there are local micro-damages in either coating or polymeric fibers, applied axial load can accelerate growth of such micro-damages or initiation of new ones, ultimately increasing the risk of fuel leakage.

The conventional techniques have been considered satisfactory for their intended purpose. However, there is an ever-present need for improved membrane cartridges, i.e., reduction of risk of fuel leakage. This disclosure provides a solution for this need.

SUMMARY

A fiber de-gassing membrane system includes a plurality of membrane fibers each defining a longitudinal membrane fiber axis. At least one of the membrane fibers has a first stiffness in a longitudinal membrane fiber axis direction. Reinforcing fibers positioned adjacent to at least one of the plurality of membrane fibers. The reinforcement fibers each define a longitudinal reinforcing fiber axis. At least one of the reinforcing fibers has a second stiffness in a longitudinal reinforcing fiber axis direction. The second stiffness is greater than the first stiffness.

In some embodiments, the reinforcing fibers include a carbon, glass, and/or organic fiber. The reinforcing fibers can include an impregnated polymeric matrix, e.g., a first polymeric matrix. The membrane fibers can be impregnated with a second polymeric matrix. The second polymeric matrix can be the same as the polymeric matrix used for impregnation of reinforcing fibers. At least one of the reinforcing fibers can be positioned adjacent to and/or abutting at least one of the plurality of membrane fibers. At least one of the reinforcing fibers can be parallel with at least one of the plurality of membrane fibers. The at least one reinforcing fiber can be configured and adapted to provide re-distribution of local axial stresses in the at least one membrane fiber arranged parallel to the at least one reinforcing fiber.

At least one of the reinforcing fibers can be positioned parallel to a longitudinal axis of the membrane system. At least one of the reinforcing fibers can be positioned at an angle α relative to a longitudinal axis of the membrane system. The angle can be an absolute angle 80 degrees or more relative to the longitudinal axis or −80 degrees or less relative to the longitudinal axis of the membrane. At least one of the reinforcing fibers can be positioned parallel to a longitudinal axis of the membrane system, radially outward from the plurality of membrane fibers. At least one of the reinforcing fibers can be positioned parallel to a longitudinal axis of the membrane system, radially inward from the plurality of membrane fibers. At least one of the reinforcing fibers can be spirally wrapped radially outward from the plurality of membrane fibers. At least one of the reinforcing fibers can be spirally wrapped radially inward from the plurality of membrane fibers.

The angle can be an absolute angle 15 degrees or less relative to the longitudinal axis of the membrane system, or −15 degrees or more relative to the longitudinal axis of the membrane system. The angle between the reinforcing fibers and the longitudinal axis of the membrane system can be greater than 20 degrees and less than 75 degrees. Similarly, the angle between the reinforcing fibers and the longitudinal axis of the membrane system can be less than −20 degrees and greater than −75 degrees.

In accordance with another aspect, a method of assembling a fiber de-gassing membrane system includes winding a plurality of membrane fibers. Each membrane fiber defines a longitudinal membrane fiber axis. At least one of the membrane fibers has a first stiffness in a longitudinal membrane fiber axis direction. The method includes adding reinforcing fibers adjacent to at least one of the plurality of membrane fibers. Each reinforcing fiber defines a longitudinal reinforcing fiber axis. The reinforcing fibers have a second stiffness in a longitudinal reinforcing fiber axis direction. The second stiffness is greater than the first stiffness.

In some embodiments, the method includes winding the reinforcing fibers adjacent to the membrane fibers concurrently with winding the membrane fibers. Adding the reinforcing fibers can include winding at least one of the reinforcing fibers adjacent to at least one of the plurality of membrane fibers concurrently with winding the plurality of membrane fibers. Winding at least one of the reinforcing fibers can include winding the reinforcing fibers parallel to at least one of plurality of membrane fibers. Adding reinforcing fibers can include positioning at least one of the reinforcing fibers in at least one of a circumferential direction or an axial direction in a reinforcing layer at least one of radially inward or radially outward from the plurality of membrane fibers.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
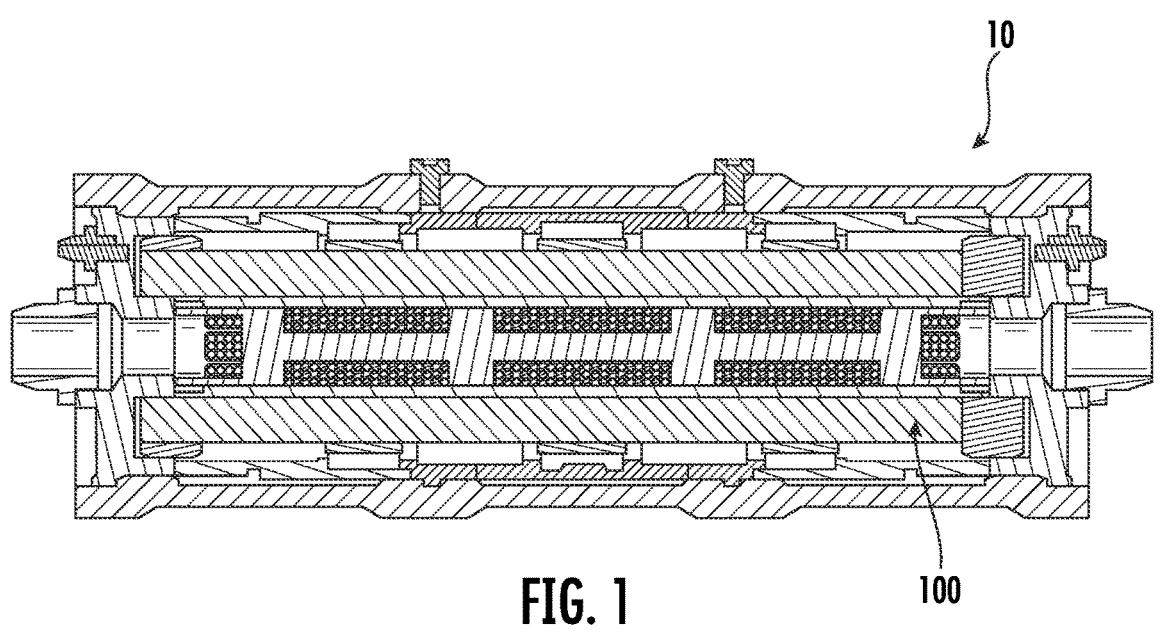
FIG. 1 is a schematic axial cross-sectional view of a portion of a fuel deoxygenation system constructed in accordance with an embodiment of the present disclosure, showing the fiber de-gassing membrane system with reinforcing fibers.

Reference will now be made to the drawings wherein like reference numerals identify similar structural features or aspects of the subject disclosure. For purposes of explanation and illustration, and not limitation, a schematic view of an exemplary embodiment of the fiber de-gassing membrane system with reinforcing fibers positioned within a fuel deoxygenation systems is shown in FIG. 1 and is designated generally by reference character 100. Other embodiments of the fiber de-gassing membrane system in accordance with the disclosure, or aspects thereof, are provided in FIGS. 2A-5 as will be described. The systems and methods described herein can be used to provide stress reduction in the fiber axial direction the absorbent interwoven membrane fibers in their axial directions, of a membrane in a fuel de-oxygenation system. Non-membrane reinforcement fibers are introduced to a membrane and help to relieve the load in the absorbent membrane fibers. By subjecting the absorbent membrane fibers to less stress, fuel leakage through the membrane is minimized.

Figure 2A:
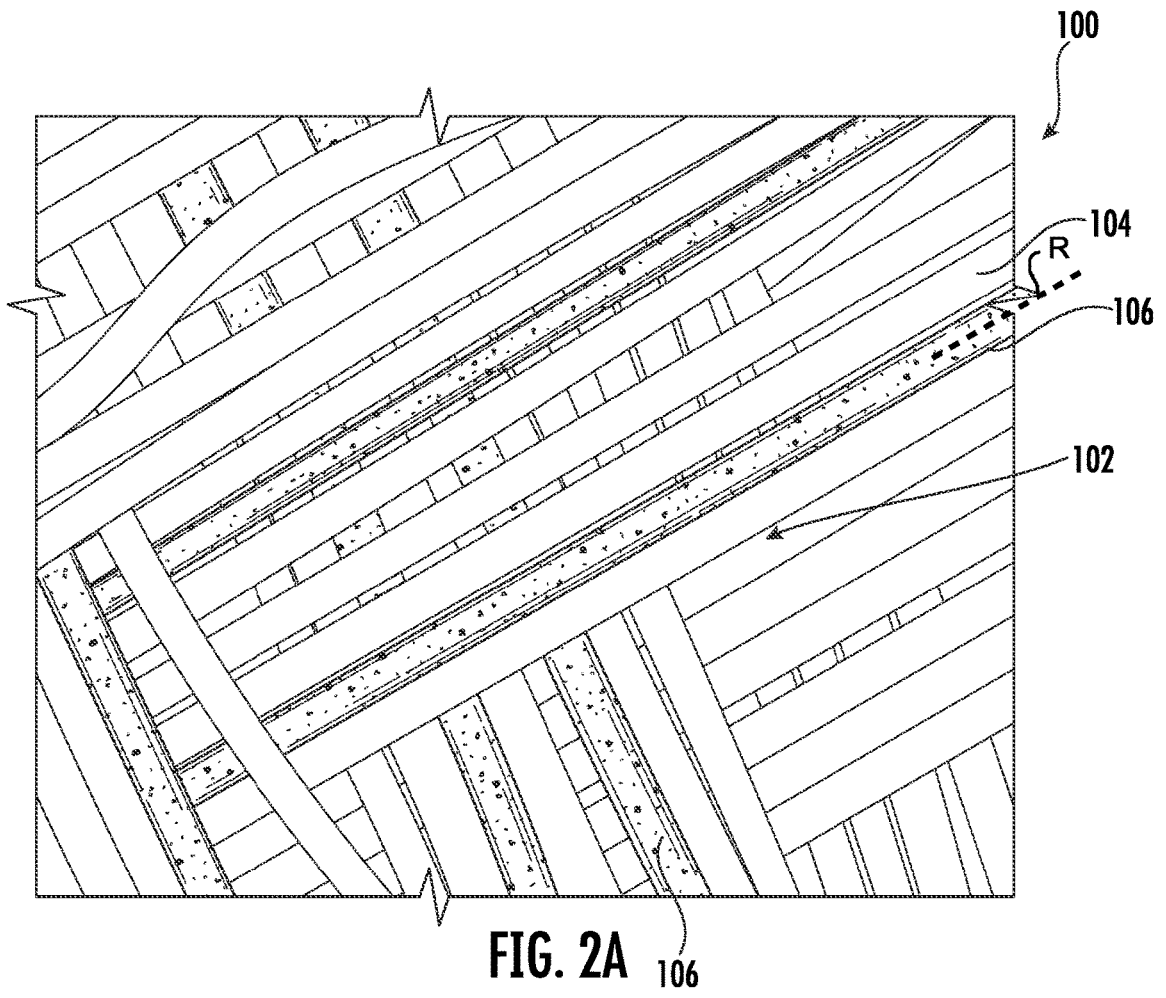
FIG. 2A is an enlarged schematic side view of the fiber membrane cartridge of FIG. 1, showing reinforcing fibers arranged parallel to the membrane fibers.
Figure 2B:
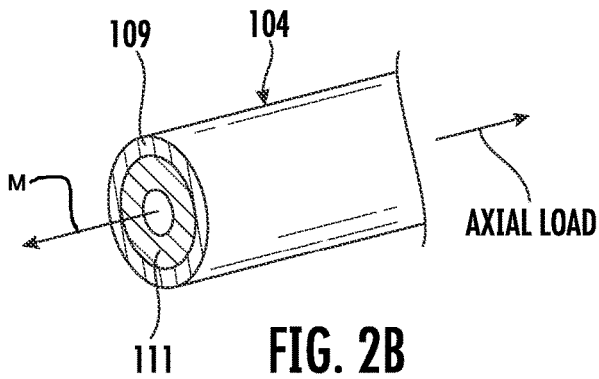
FIG. 2B is an enlarged schematic perspective view of a portion of the membrane fiber of membrane cartridge of FIG. 1, showing an individual membrane fiber, including its polymeric core and its respective coating.

As shown in FIGS. 1-2B, a fuel deoxygenation system 10 includes a fiber de-gassing membrane system 100. Fiber de-gassing membrane system 100 includes a combination of membrane fibers 104. The membrane system 100 includes reinforcing fibers 106. Reinforcing fibers 106 are positioned adjacent to the membrane fibers 104. Reinforcing fibers 106 are interwoven with the membrane fibers 104 parallel to membrane fibers 104. Each membrane fiber 104 defines a longitudinal membrane fiber axis M. Each membrane fiber 104 has a first stiffness in a direction aligned with its longitudinal membrane fiber axis. Each reinforcing fiber 106 defines a longitudinal reinforcing fiber axis R. The reinforcing fibers 106 have a second stiffness in a direction aligned with its longitudinal reinforcing fiber axis. The second stiffness is greater than the first stiffness. The reinforcing fibers 106 are configured and adapted to provide re-distribution of local stresses in the direction of respective longitudinal membrane fiber axes between parallelly-arranged membrane fibers 104. This re-distribution is aimed to reduce local stresses in membrane fibers in the membrane fiber axial direction, i.e., reduce risk of their damage and associated probability of fuel leakage. Reinforcing fibers 106 are generally impermeable and therefore do not perform membrane functions but help to relieve axial load in membrane fibers 104.

With continued reference to FIGS. 1-2B, it is contemplated that reinforcing fibers 106 include a carbon fiber, a glass fiber, an organic fiber (e.g., Kevlar) material, and/or any other suitable material in a variety of combinations. In some embodiments, the reinforcing fibers 106 include an impregnated polymeric matrix (e.g., thermoplastics, thermosets, elastomers, etc.). The membrane fibers 104 can include a polymeric matrix with hollow fiber body 111 with covered with coating 109. The polymeric matrix can be the same as the impregnated polymeric matrix in reinforcing fibers 106 or different.

The addition of reinforcing fibers 106 offers a low-cost option to enhance durability of membrane fibers 104 by reducing membrane micro-damage to coating 109, thereby and improving leakage resistance. Those skilled in the art will readily appreciate that interweaving non-membrane "parasitic" tension elements with high stiffness with membrane fibers 104, results in a significant re-distribution of local stresses between parallelly-arranged membrane and non-membrane fibers, 104 and 106 respectively. In this case, membrane fibers are much less loaded, i.e., have significantly lower risk of micro-damage.

Figure 3:
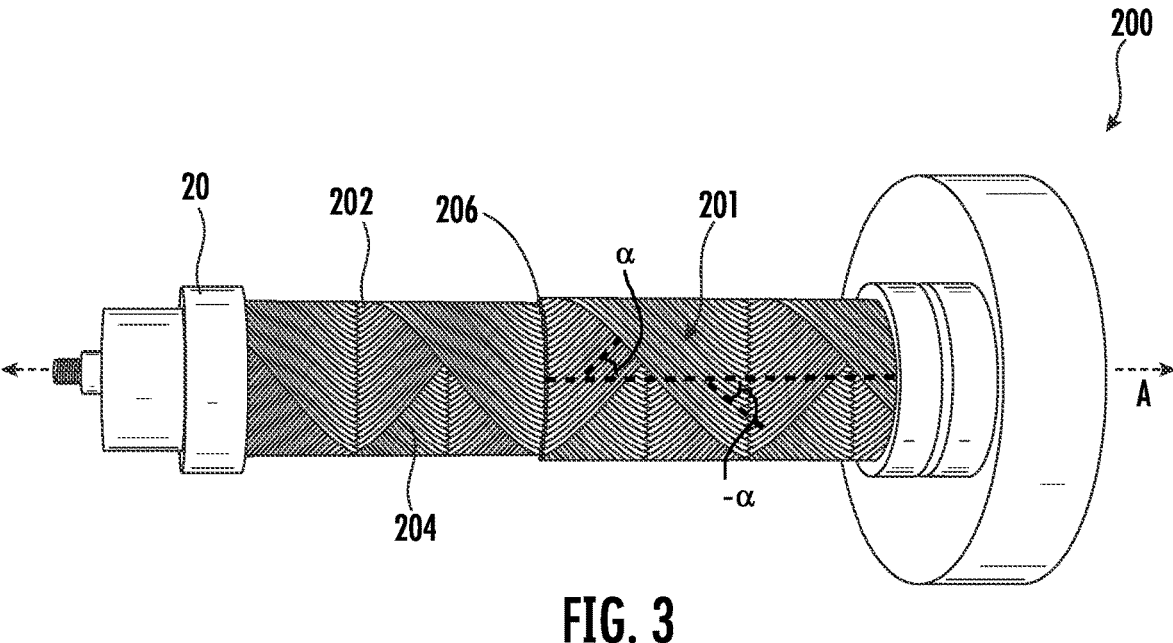
FIG. 3 is a schematic side perspective cut-away view of another embodiment of a fiber de-gassing membrane system for use in the fuel deoxygenation system of FIG. 1, showing reinforcing fibers arranged separately from membrane fibers at an angle α relative to the longitudinal axis along a winding spool.

As shown in FIG. 3, another embodiment of a fiber de-gassing membrane system 200 includes a plurality of membrane fibers 204. In the embodiment of FIG. 3, membrane fibers 204 form at least one layer 202 that can be interwoven with other layers. Membrane system 200 includes reinforcing fibers 206. Orientation of reinforcing fibers 206 with respect to the longitudinal orientation of the membrane system is defined by angle +α (or −α in the anti-symmetric direction). Membrane system 200 is similar to membrane system 100, except that instead of showing reinforcing fibers 206 with membrane fibers 204 in a common layer, or interwoven with membrane fibers 204, they make up their own layer 201. It is also contemplated that the interwoven layers of membrane system 100 could be combined with the individual layers 201 of reinforcing fibers 206 of membrane system 200 into the same membrane. In the reinforcing layer 201, the reinforcing fibers 206 are arranged at an angle α relative to longitudinal axis A of the membrane system 200. Angle α between the reinforcing fibers 206 and the longitudinal axis is greater than 20 degrees and less than 75 degrees. Similarly, this angle α between the reinforcing fibers 206 and the longitudinal axis A can be less than −20 degrees and greater than −75 degrees.

Figure 4:
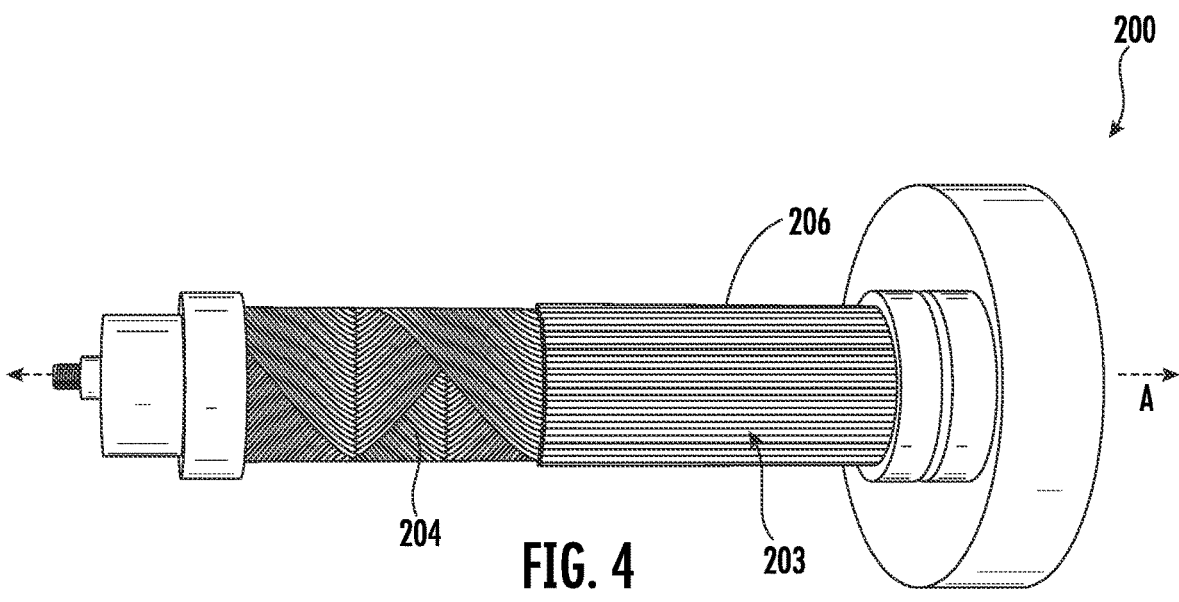
FIG. 4 is a schematic side perspective cut-away view of another embodiment of a fiber de-gassing membrane system for use in the fuel deoxygenation system of FIG. 1, showing reinforcing fibers arranged separately from the membrane fibers parallel to the longitudinal axis of the membrane system.

With reference now to FIG. 4, membrane system 200 is the same as membrane system 200 of FIG. 3. In the embodiment of FIG. 4, reinforcing fibers 206 are arranged in an axial direction, extending from one end of the membrane system 200 to the other. Fibers 206 are shown grouped into a layer 203 of reinforcing fibers 206, however those skilled in the art will readily appreciate that reinforcing fibers 206 can be interwoven with membrane fibers 204 as well. In all of the embodiments for FIGS. 3-5, the membrane fibers 204 have a first stiffness in a membrane fiber axis direction and the reinforcing fibers 206 have a second stiffness in a reinforcing fiber axis direction. The second stiffness is greater than the first stiffness. The reinforcing fibers 206 can be radially inward or radially outward from membrane fibers 204. In the embodiment of FIG. 4, the angle α is an absolute angle 15 degrees or less relative to the longitudinal axis. Similarly, this angle α can be an absolute angle –15 degrees or greater relative to the longitudinal axis.

Figure 5:
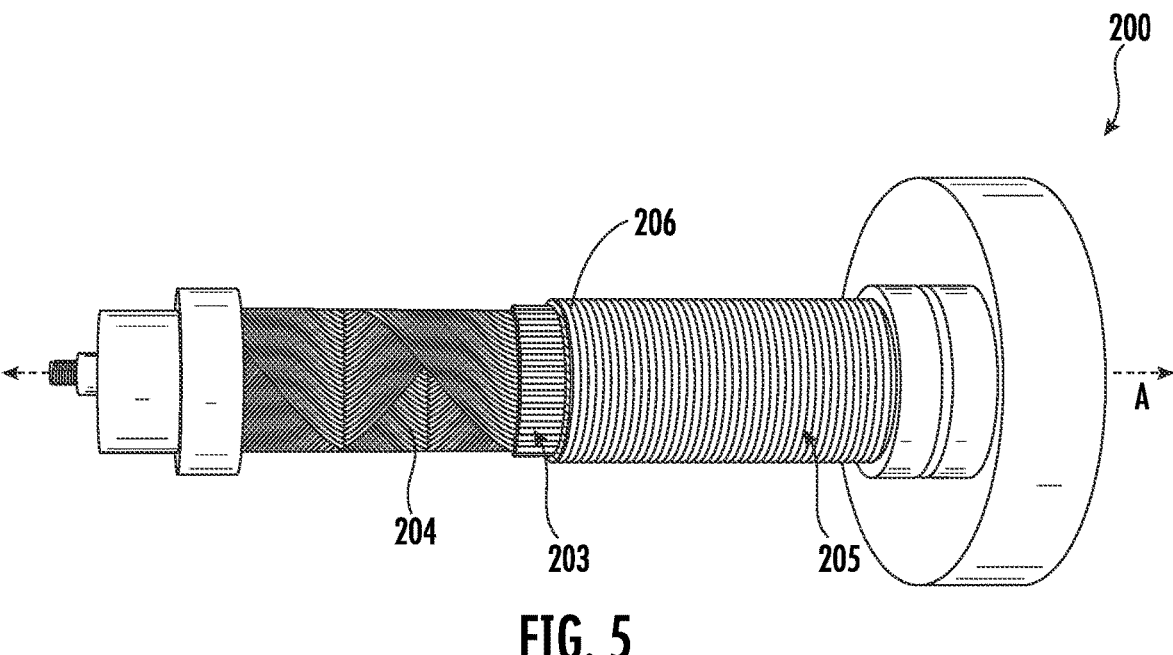
FIG. 5 is a schematic side perspective cut-away view of another embodiment of a fiber de-gassing membrane system for use in the fuel deoxygenation system of FIG. 1, showing reinforcing fibers arranged separately from the membrane fibers substantially orthogonal to the longitudinal axis of the membrane system.

As shown in FIG. 5, membrane system 200 is the same as membrane system 100 of FIG. 3, except that reinforcing fibers 206 are arranged at an angle α relative to longitudinal axis A of the membrane that is in the hoop direction, e.g., substantially circumferential. In FIG. 5, the reinforcing fibers 206 are shown grouped together in a reinforcing layer 205. In FIG. 5, the angle α is an absolute angle 80 degrees or more relative to the longitudinal axis. Similarly, angle α is an absolute angle –80 degrees or less relative to the longitudinal axis. Similar to above, the membrane fibers 204 have a first stiffness in their longitudinal membrane fiber axis direction and reinforcing fibers 206 have a second stiffness in their longitudinal reinforcing fiber axis direction. The second stiffness is greater than the first stiffness.

With continued reference to FIG. 5, it is also contemplated that axially arranged reinforcing fibers 206, like those of FIG. 4, can be used in the same membrane system 200 as reinforcing fibers 206 arranged in the hoop direction, like those of FIG. 5, and/or reinforcing fibers 206 of layer 202 of FIG. 3. In conventional membrane layups, the membrane fibers are mainly two-directional, i.e., as +α and –α, where a is typically close to 45 deg. In the case of non-ideal implementations or conditions (imperfections, misalignments, statistical variation, non-uniformity through thickness, etc.) two-directional layups can be associated with considerable local overload due to limited ability of individual fibers to handle stresses other than axial ones. By adding reinforcing fibers 206 in the hoop direction, axial direction, parallel to existing membrane layers, or in some combination, in addition to [+α/–α] layers 102 of FIGS. 1-2B, local overload can be reduced.

A method of assembling a fiber de-gassing membrane, e.g., membrane system 100 or 200, includes winding a plurality of membrane fibers, e.g., membrane fibers 104 or 204, around a spool 20. Each membrane fiber defines a longitudinal membrane fiber axis. At least one of the membrane fibers has a first stiffness in a direction aligned with its longitudinal membrane fiber axis. The method includes adding reinforcing fibers, e.g., reinforcing fibers 106 or 206, adjacent to at least one of the plurality of membrane fibers. The reinforcing fibers have a second stiffness in a direction aligned with its longitudinal reinforcing fiber axis. The second stiffness is greater than the first stiffness. Adding the reinforcing fibers includes winding the reinforcing fibers in the membrane fibers concurrently with winding the membrane fibers. Winding the reinforcing fibers can include winding the reinforcing fibers parallel with the membrane fibers. Adding reinforcing fibers can include positioning the reinforcing fibers in at least one of a circumferential, axial or oblique direction at least one of radially inward or radially outward from the plurality of membrane fibers.

The methods and systems of the present disclosure, as described above and shown in the drawings, provide for low-cost systems and methods for reducing stress on membrane fibers, thereby reducing fuel leakage, with superior properties including improved reliability and product quality. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fiber de-gassing membrane system, the system comprising:
   a plurality of membrane fibers each defining a longitudinal membrane fiber axis, wherein at least one of the membrane fibers has a first stiffness in a longitudinal membrane fiber axis direction, wherein the plurality of membrane fibers are arranged in a plurality of membrane layers; and
   reinforcing fibers positioned adjacent to at least one of the plurality of membrane fibers, wherein the reinforcement fibers each define a longitudinal reinforcing fiber axis, wherein the reinforcing fibers have a second stiffness in a longitudinal reinforcing fiber axis direction, wherein the second stiffness is greater than the first stiffness, wherein at least one of the reinforcing fibers is positioned at an angle relative to a longitudinal axis of the membrane system, wherein an angle between at least one of the reinforcing fibers and the longitudinal axis of the membrane system is at least one of greater than 20 degrees and less than 75 degrees, or less than-20 degrees and greater than –75 degrees,
   wherein the reinforcing fibers are arranged in a plurality of reinforcing layers, at least one of the reinforcing layers arranged radially inward of all of the plurality of membrane layers, and at least one of the reinforcing layers arranged radially outward from at least one of the plurality of membrane layers; and
   wherein the reinforcing fibers are separate from the membrane fibers, and further wherein the reinforcing fibers are adjacently interspersed with the plurality of membrane fibers in at least one of the plurality of membrane layers, the reinforcing fibers extending parallel to the plurality of membrane fibers.

2. The membrane as recited in claim 1, wherein the reinforcing fibers include at least one of a carbon, glass, or organic material.

3. The membrane as recited in claim 1, wherein the reinforcing fibers include an impregnated polymeric matrix.

4. The membrane as recited in claim 3, wherein the polymeric matrix is a first polymeric matrix, and wherein the membrane fibers include a second polymeric matrix, wherein the second polymeric matrix is the same as the first polymeric matrix.

5. The membrane as recited in claim 1, wherein at least one of the reinforcing fibers is abutting at least one of the plurality of membrane fibers.

6. The membrane as recited in claim 5, wherein the at least one reinforcing fiber is configured and adapted to provide reduction of local axial stresses in the at least one membrane fiber arranged parallel to the at least one reinforcing fiber.

7. The membrane as recited in claim 1, wherein at least one of the reinforcing fibers is positioned at an angle relative to a longitudinal axis of the membrane system, wherein the angle is at least one of an absolute angle 80 degrees or more relative to the longitudinal axis, or is an absolute angle –80 degrees or less relative to the longitudinal axis.

8. The membrane as recited in claim 1, wherein at least one of the reinforcing fiber layers is positioned parallel to a longitudinal axis of the membrane system, radially outward from the plurality of membrane fibers.

9. The membrane as recited in claim 1, wherein at least one of the reinforcing fiber layers is positioned parallel to a longitudinal axis of the membrane system, radially inward from the plurality of membrane fibers.

10. The membrane as recited in claim 1, wherein at least one of the reinforcing fiber layers is spirally wrapped radially outward from the plurality of membrane fibers.

11. The membrane as recited in claim 1, wherein at least one of the reinforcing fiber layers is spirally wrapped radially inward from the plurality of membrane fibers.

12. The membrane as recited in claim 1, wherein at least one of the reinforcing fibers is arranged at an angle relative to a longitudinal axis of the membrane system, wherein the angle is an absolute angle at least one of 15 degrees or less relative to the longitudinal axis, or −15 degrees or more relative to the longitudinal axis.

\* \* \* \* \*